United States Patent [19]

Tsuge et al.

[11] Patent Number: 4,511,097

[45] Date of Patent: Apr. 16, 1985

[54] AUTOMOBILE SEAT BELT WINDING DEVICE

[75] Inventors: Noboru Tsuge, Kariya; Masahiro Taguchi, Okazaki; Satosi Kuwakado, Aichi, all of Japan

[73] Assignee: Nippon Soken, Inc., Nishio, Japan

[21] Appl. No.: 448,326

[22] Filed: Dec. 9, 1982

[30] Foreign Application Priority Data

| Dec. 14, 1981 | [JP] | Japan | 56-201873 |
| Apr. 3, 1982 | [JP] | Japan | 57-54779 |
| Apr. 7, 1982 | [JP] | Japan | 57-49425[U] |
| Apr. 26, 1982 | [JP] | Japan | 57-68757 |
| Oct. 1, 1982 | [JP] | Japan | 57-173440 |
| Oct. 21, 1982 | [JP] | Japan | 57-183683 |

[51] Int. Cl.$^3$ .............................................. A62B 35/00
[52] U.S. Cl. ........................... 242/55; 242/107.4 R; 280/807; 280/808; 297/475; 200/61.58 B; 180/268
[58] Field of Search ............. 242/55, 67.1 R, 107, 242/107.4 R–107.4 E; 280/806–808; 180/268, 269; 297/474–480; 200/67 C, 153 K, 276, 61.58 B

[56] References Cited

U.S. PATENT DOCUMENTS

| 1,977,887 | 10/1934 | Murray | 200/153 K |
| 3,182,923 | 5/1965 | Botar | 242/55 |
| 3,199,804 | 8/1965 | Fontaine | 242/67.1 R |
| 3,689,881 | 9/1972 | Hayashi et al. | 200/61.58 B X |

FOREIGN PATENT DOCUMENTS

| 2914235 | 10/1979 | Fed. Rep. of Germany ... 242/107.4 R |
| 2828297 | 1/1980 | Fed. Rep. of Germany ...... 280/806 |
| 3019298 | 11/1981 | Fed. Rep. of Germany ... 242/107.4 R |
| 49527 | 4/1977 | Japan ................................. 180/268 |

Primary Examiner—John M. Jillions
Attorney, Agent, or Firm—Cushman, Darby & Cushman

[57] ABSTRACT

An automobile seat belt winding device is disclosed. The device comprises a retractor which has a belt winding shaft. The shaft is driven by a motor, the operation of which is controlled by control circuits so that the belt is wound when not being worn and when a slack occurs.

A slack sensor comprises a switch and a slip joint, and a slack in the belt is detected due to changing of the position of the slip joint.

15 Claims, 17 Drawing Figures

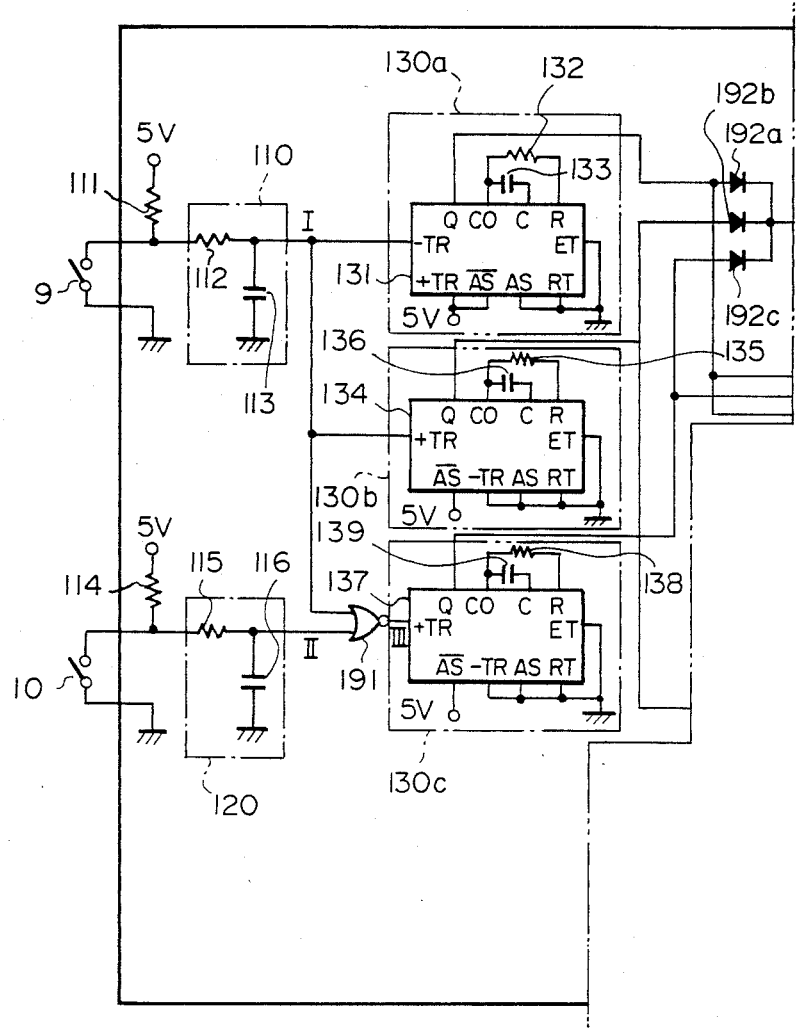

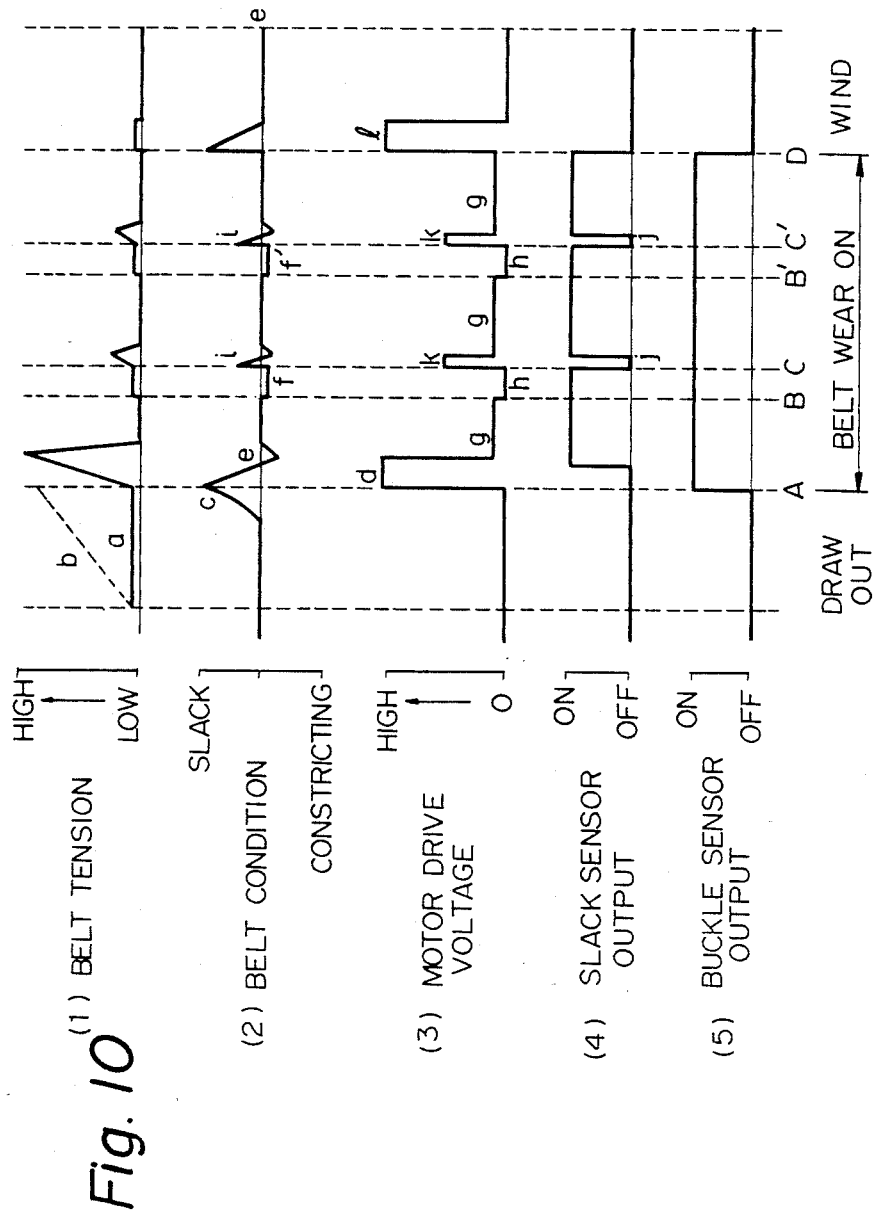

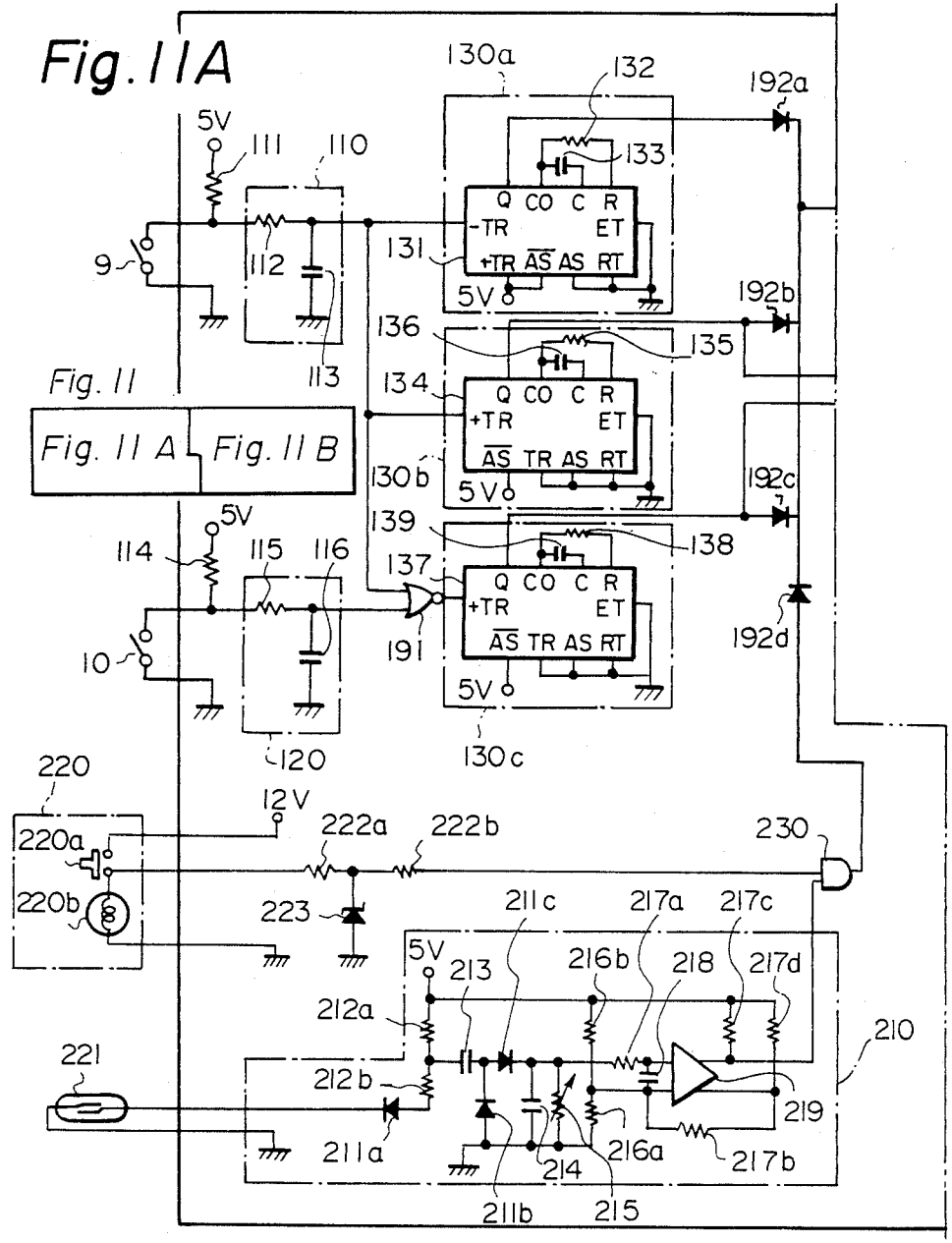

AUTOMOBILE SEAT BELT WINDING DEVICE

BACKGROUND OF THE INVENTION

The present invention relates to an automobile seat belt winding device.

An automobile seat belt is generally provided with a seat belt retractor for locking the seat belt in case an accident occurs and for winding it into a retracted position when it is not in use. In such a known retractor, a spiral spring is utilized to impart a winding force to a shaft onto which the belt is wound. The belt, therefore, always has a tension due to the force of the spiral spring. Therefore, a considerable force is necessary to buckle the seat belt. In addition, the driver and passengers have a feeling of constriction while wearing the seat belt, and, as a result, some persons feel uncomfortable wearing such a seat belt despite its protective characteristic.

SUMMARY OF THE INVENTION

It is an object of the present invention to solve the above-mentioned problem and to provide an automobile seat belt winding device whereby a seat belt can be easily and comfortably worn and there is no feeling of constriction on the part of the driver and passengers.

The present invention provides an automobile seat belt winding device comprising a seat belt retractor, the retractor having a rotatable winding shaft for the seat belt to be wound thereonto; a means for driving the shaft for winding the seat belt, which driving means comprises preferably an electric direct-current motor; a first sensor for sensing whether the seat belt is being worn or not; a second sensor for sensing a slack in the seat belt; and a control means responsive to the first and second sensors for controlling the driving means so that the driving means winds the seat belt after the seat belt is taken off and when there is a slack in the seat belt while the seat belt is being worn.

The second sensor comprises a switch and a slip joint for guiding the seat belt. The slip joint can move between a first position, in which it hangs freely from a pivot shaft means, and a second position, in which it is tapered relative to the first position due to the belt tension, and thereby the switch is operated due to the changing of the position of the slip joint.

Other features and advantages of the present invention are described below in more detail with reference to the attached drawings illustrating the preferred embodiments of the invention.

BRIEF DESCRIPTION OF THE DRAWINGS

In the drawings

FIGS. 9A–9C represent a circuit diagram of the controller in FIG. 1;

FIG. 9 is a composite drawing showing the relationship between the circuits of FIGS. 9A–9C.

FIG. 10 illustrates the operation of the motor in connection with the controller in FIGS. 9A–9C.

FIGS. 11A and 11B represent another circuit diagram of the controller in FIG. 1;

DETAILED DESCRIPTION OF THE PREFERRED EMBODIMENTS

In many recent automobiles, the seat belt comprises a shoulder belt which holds the upper part of the body of the driver and passengers and a lap belt which holds the lower part of the body of the driver and passengers. The shoulder belt and lap belt consist of a single belt, one end of which is secured to a retractor anchored to the automobile frame and the other end of which is directly anchored to the automobile frame. A buckle is attached to the belt so as to connect the belt to a connector anchored to the automobile frame on the opposite side of the seat. Thus, the belt is divided into a shoulder belt and a lap belt by the buckle. In such a belt, a slip joint is provided for guiding the belt between the retractor and the buckle.

Figure 1:
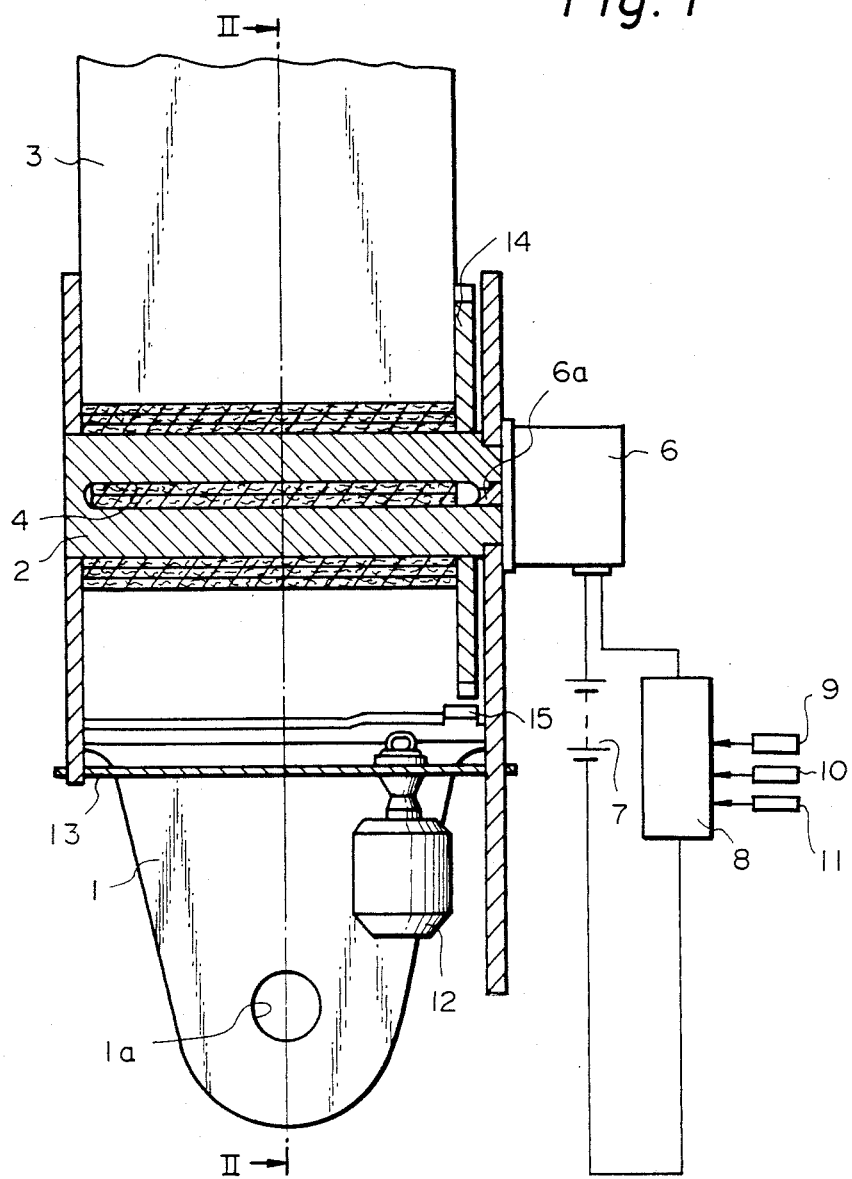
FIG. 1 is a schematic sectional front view of a seat belt winding device comprising a seat belt retractor, according to an embodiment of the present invention, taken along the line I—I in FIG. 2.
Figure 2:
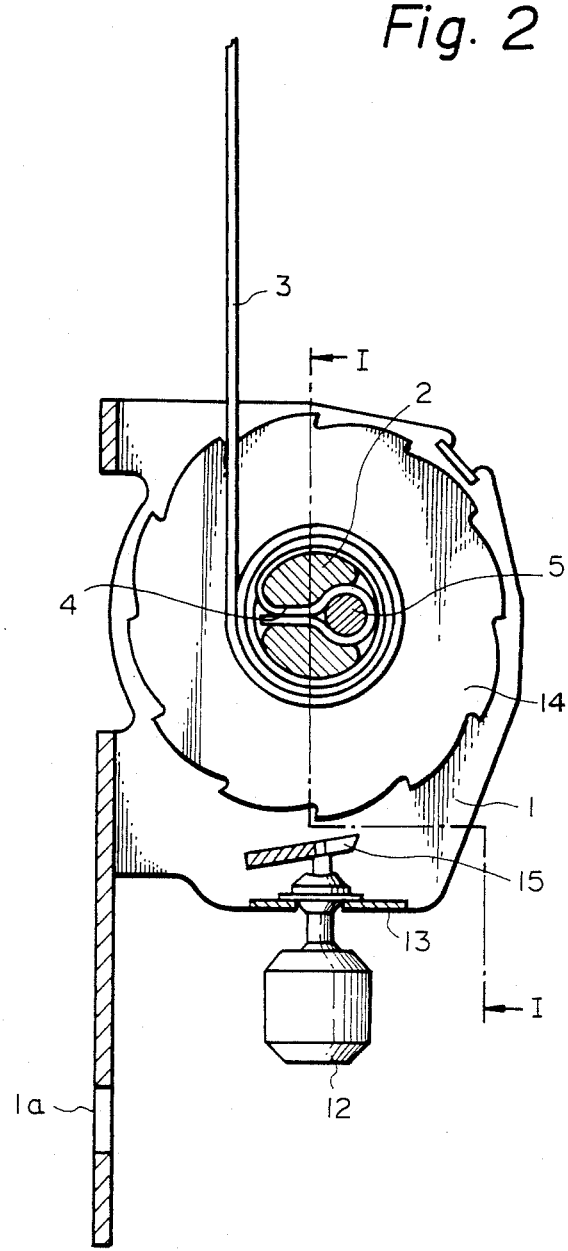
FIG. 2 is a sectional view of the seat belt winding device taken along the line II—II in FIG. 1.

Referring now to FIGS. 1 and 2, a retractor 1, having a seat belt winding device according to the present invention, is shown. At the bottom of the retractor 1 in FIG. 1, a hole 1a is provided, which hole 1a is adapted to receive a bolt means which is anchored to the automobile frame. A winding shaft 2 is rotatably secured to the retractor 1 to wind a seat belt 3 thereonto. The shaft 2 has a slit 4 so that one end of the belt 3 can pass therethrough. This one end of the belt 3, as shown in FIG. 2, is sewn so that it forms a loop, into which a small shaft 5, which cannot pass through the slit 4, is inserted. Thus, this one end of the belt 3 is secured to the winding shaft 2, and the belt 3 can be wound onto the shaft 2 upon rotation of the shaft 2.

An electric direct-current motor 6 is attached to the retractor 1. A rotating shaft 6a of the motor 6 is directly coupled with the winding shaft 2 in this embodiment, but any reduction mechanism can be used between the shafts 4 and 6a. A voltage is supplied to the motor 6, by a battery charger 7, through a controller 8 which receives the outputs of several sensors, for example, a buckle sensor 9 which senses whether the seat belt is being worn or not, that is, whether the buckle is coupled with the connector or not, a slack sensor 10 which senses a slack in the belt 3, and a belt roll sensor 11 which senses the diameter of the belt roll wound around the winding shaft 2.

Alternatively, the retractor 1 also has a seat belt locking mechanism for protecting the driver and passengers if an accident occurs. This mechanism, which is well known, is described briefly. The locking mechanism comprises a pendulum 12 attached to a horizontal bracket 13 and a gear 14 firmly coupled with the shaft 2. When the automobile is suddenly stopped, the pendulum 12 swings due to inertia, and a pawl 15 of the pendulum 12 engages with the gear 14, whereby the winding shaft 2 is prevented from rotating, with the result that the driver and passengers are firmly held by the seat belt 3.

Figure 3:
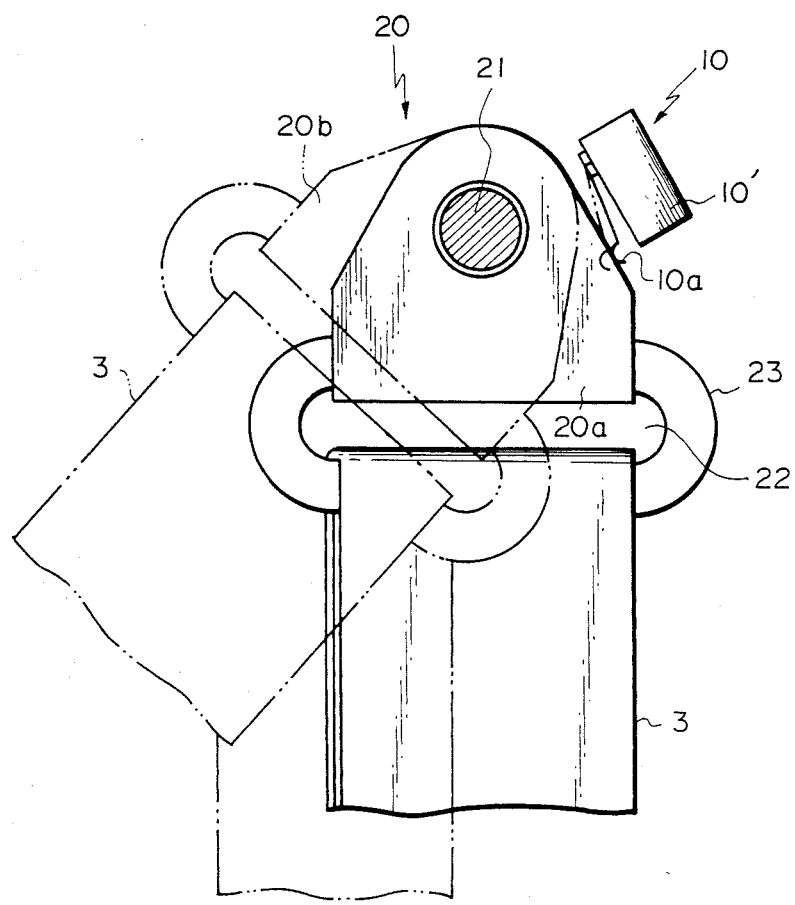
FIG. 3 is a schematic view of a slack sensor using a slip joint which guides the seat belt.
Figure 4:
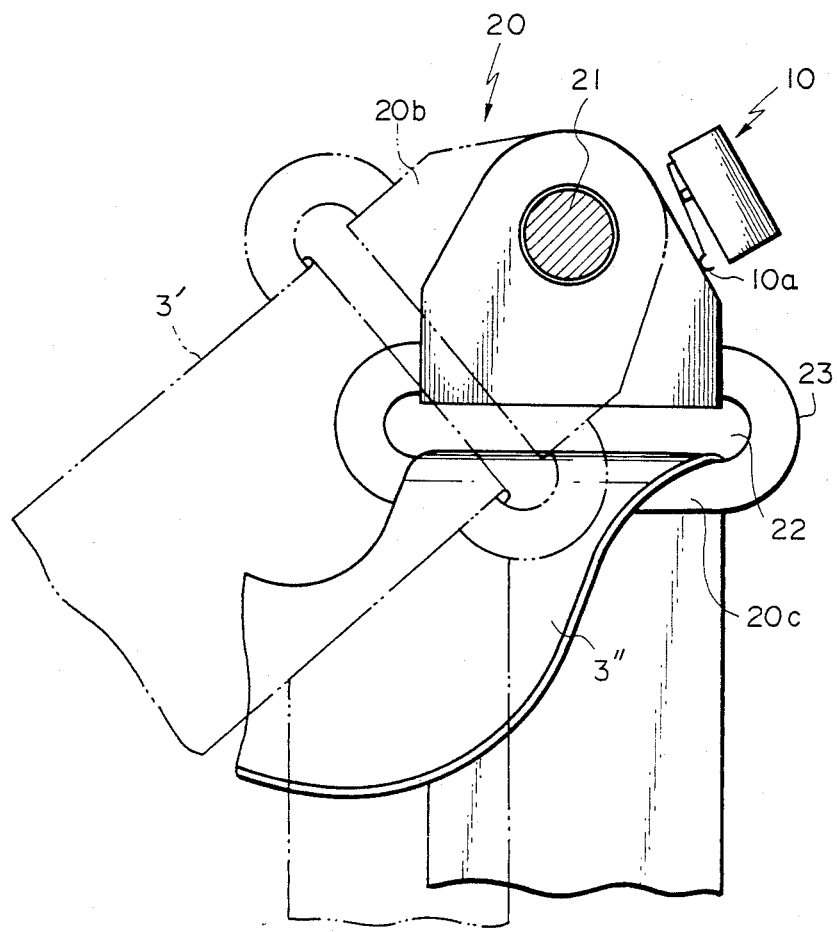
FIG. 4 is a view similar to FIG. 3, illustrating the position of the slip joint when a slack occurs in the seat belt.

Referring to FIGS. 3 and 4, the slack sensor 10 comprising a switch 10' and a slip joint 20, previously mentioned, is shown. The switch 10' is secured to the frame of the automobile at a position in which the motive portion 10a of the switch 10' can selectively contact the slip joint 20, and the switching of position of the switch is effected by the changing of position of the slip joint 20, as is described below. The slip joint 20 is pivotably secured to the frame of the automobile by a pivot shaft or bolt 21. The seat belt 3 is passed through an opening 22 of the slip joint element 23. Therefore, when the seat belt 3 is not being worn, the slip joint 20 is in a first position 20a and hangs down from the pivot shaft 21 under its own weight and the weight of the belt 3. When the belt is being worn, the slip joint 20 is moved into a second position 20b tapered relative to the first position, as shown by the semi-broken line in FIG. 3, since the seat belt, especially the shoulder belt, extends downwardly across the seat. Thus, the switch 10' can be located so that the motive portion 10a thereof contacts the slip joint 20 in accordance with the position of the slip joint. In this second position, if the belt is slackened, for example, if the driver reaches for a distant object, thereby elongating the belt, and then returns to his original position, the slip joint 20 returns to a position close to the first position, as shown by 20c in FIG. 4, since the slip joint 20 is tapered due to only the tension first imparted to the belt, and perpetual tension, due to the force of a spiral spring, is not imparted. The switch 10' is preset to cut off the current when the slip joint 20 is in the first position or in a position close to the first position when the belt is slackened and to supply current when the slip joint 20 is in the second position.

Figure 5:
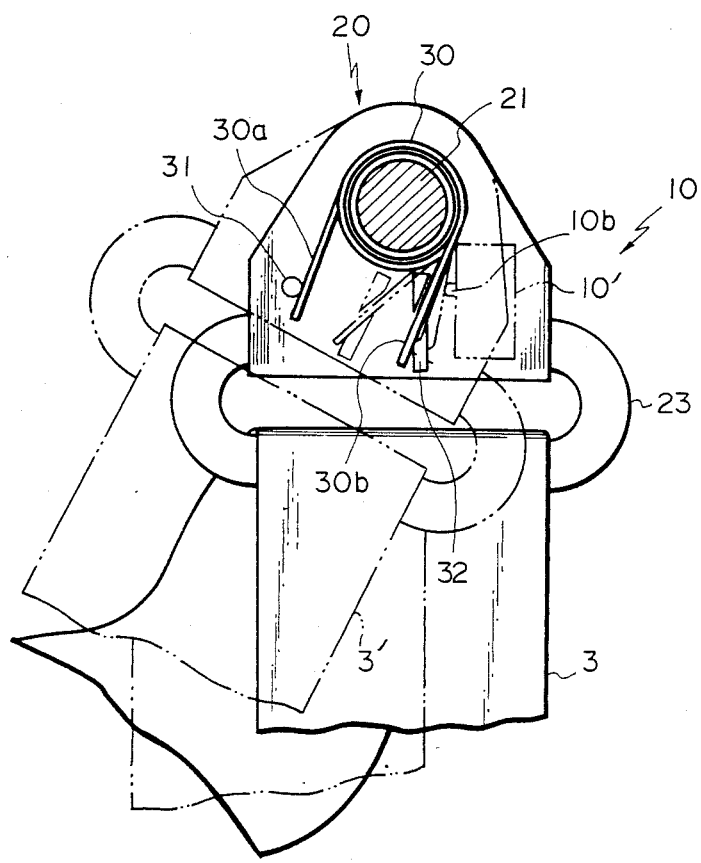
FIG. 5 is a view similar to FIG. 3, showing another example of a slack sensor.

FIG. 5 shows another example of a slack sensor 10. This sensor 10 comprises a switch 10' having a push button 10b and a slip joint 20 similar to that shown in FIGS. 3 and 4. However, the slip joint 20 in FIG. 5 is biased, due to a spring 30, in a counterclockwise direction toward the first position, as described above, one end 30a of the spring 30 being fixed to the frame of the automobile with a pin 31 and the other end 30b being fixed to the slip joint 20. To the free end 30b of the spring 30, there is connected a push plate 32 which makes contact with the push button 10b of the switch 10' also fixed to the frame of the automobile. The switch 10' in this example is operated in a manner similar to that of the switch 10' of FIGS. 3 and 4. Also, the spring force of the spring 30 is selected so that it does not create a feeling of constriction on the part of the driver and passengers; rather, it only aids in sensing a slack in the belt by imparting a force to the slip joint 20 provided that the motion of the slip joint is small.

Figure 6:
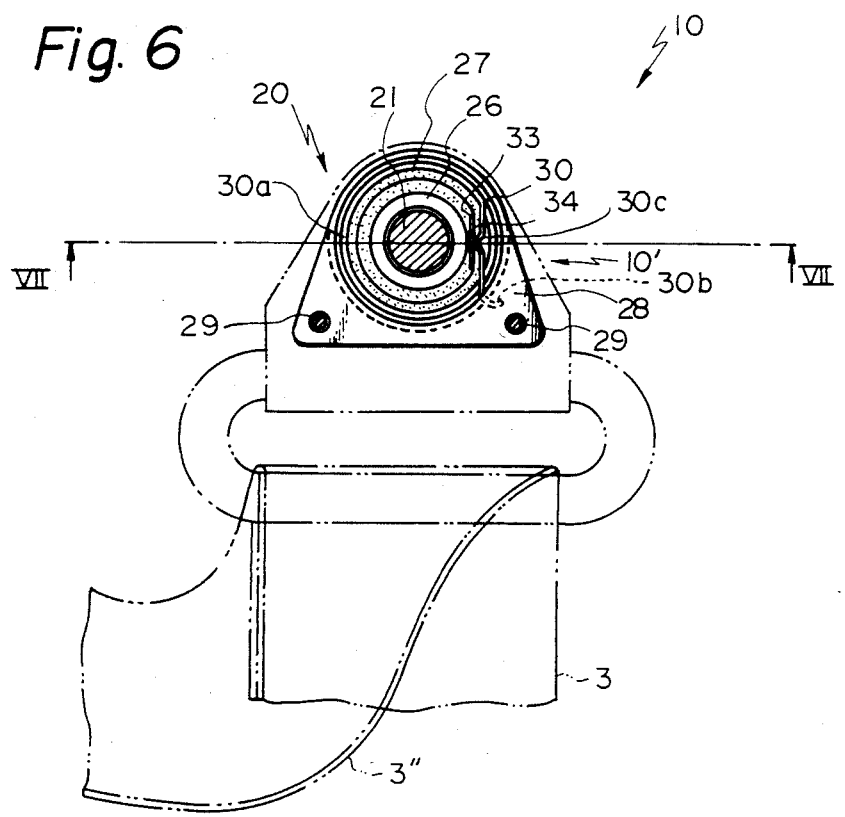
FIGS. 6 through 8 are views of still another example of a slack sensor, the slip joint being in a first position and in a second position in FIGS. 6 and 8, respectively, and FIG. 7 being a sectional view of a slack sensor taken along the line VII—VII in FIG. 6.
Figure 7:
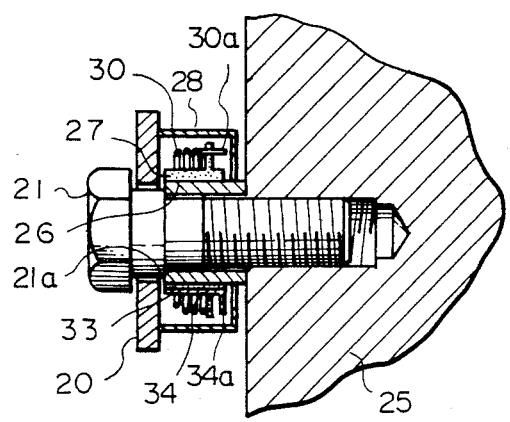
Figure 8:
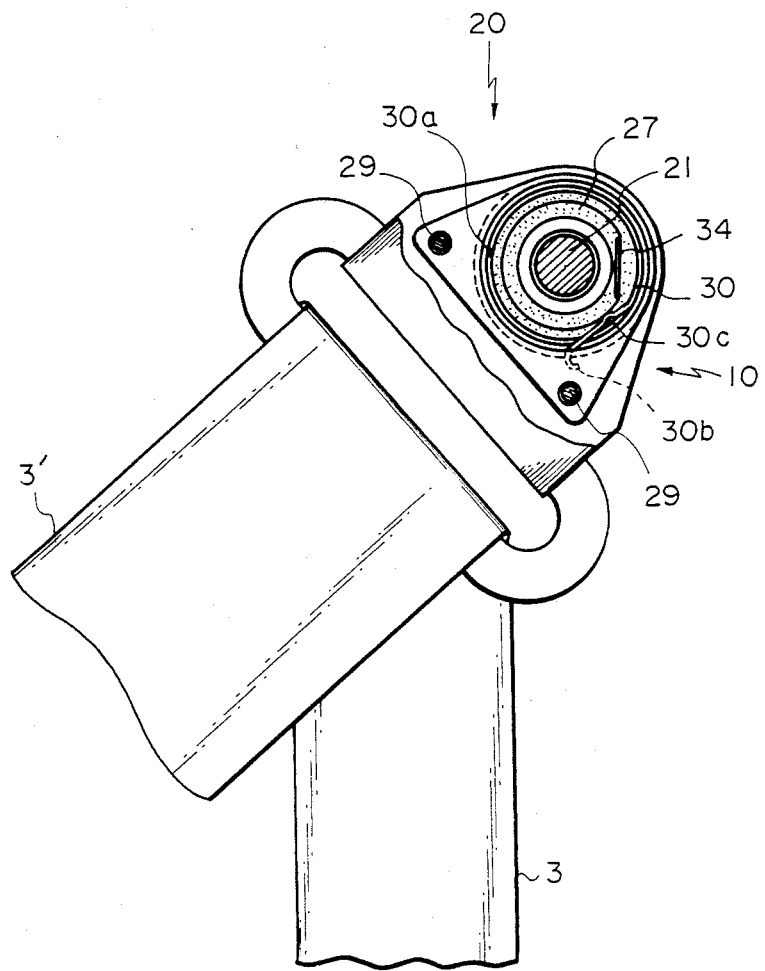

FIGS. 6 through 8 show another example of a slack sensor 10 which is a switch 10' comprising a slip joint 20 and a spring 30. The slip joint 20 is pivotably secured to the body 25 of the automobile with a bolt 21, as shown in FIG. 7. A collar 26 and a flanged insulation collar 27 are concentrically fixed to the bolt 21 between a shoulder 21a of the bolt 21 and the body 25 of the automobile. One end 30a of the spring 30 is fixed to the bottom flange of the insulation collar 27 and the other end 30b (FIG. 6) thereof is fixed to a protection tube 28, which is spaced a distance from and around the insulation collar 27 and which is fixed to the slip joint 20 with screws 29. The spring 30 has an inwardly projecting or bent portion 30c adjacent to the free end 30b. The insulation collar 27 has a longitudinal recess 33 into which a plate 34 is inserted to form a base terminal of the switch 10'. The plate 34 has a projection 34a at its base so as to form a lead terminal. The insulation collar 27 and the protection tube 28 are made of electrically insulating materials, whereas the spring 30 and the plate 34 are made of electrically conductive materials. The spring 30 and the plate 34 are connected to an electric supply source, respectively, to form the switch 10', the switch having two operating positions, the first position being when the inwardly projecting portion 30c of the spring 30 makes contact with the plate 34 and the second position being when the projecting portion 30c does not make contact with the plate 34. In this example, the portion 30c and the plate 34 make contact when the slip joint 20 is in the first position, as described in FIGS. 3 and 4, or near to the first position and do not make contact when the joint 20 is in the second position, as described in FIGS. 3 and 4. Thus, a slack in the belt is detected by the changing of the position of the slip joint 20.

Figure 9B:
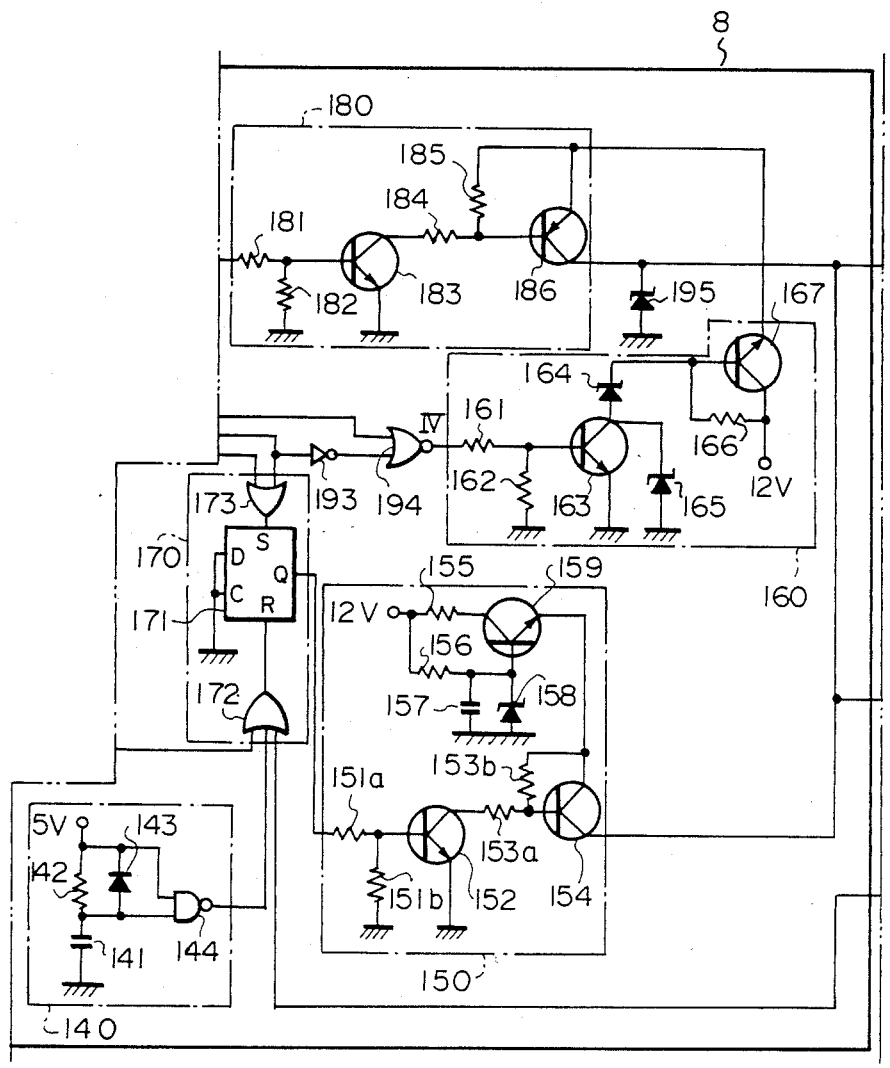
Figure 9C:
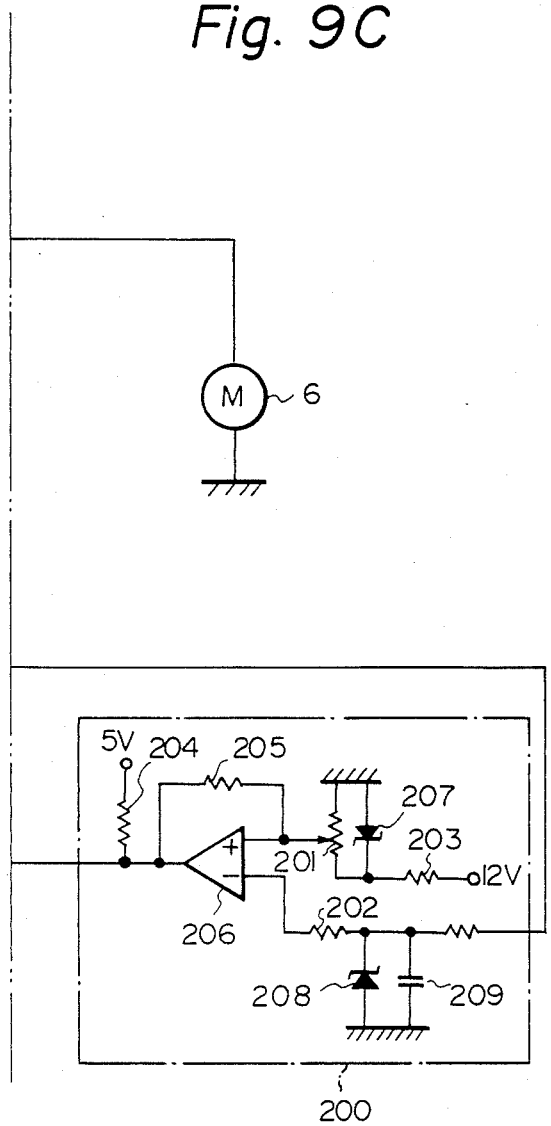

FIG. 9 shows a circuit diagram of the controller 8 in FIG. 1. The buckle sensor and slack sensor are shown as switches 9 and 10, respectively. The outputs of the switch 9 and the switch 10 are input into the controller 8, the output of the belt roll sensor 11 not being shown for the sake of clarity.

The switch 9 is connected to a filter circuit 110 comprising a resistor 112 and a capacitor 113 by a resistor 111, where the voltage is in the 1 state when the buckle is not coupled. The filter circuit 110 is then connected to control pulse generating circuits 130a, 130b and a NOR gate 191. The circuit 130a comprises a monostable multivibrator 131, a resistor 132, and a capacitor 133 and generates a predetermined pulse width when the input changes from the 1 state to the 0 state. Therefore, the circuit 130a generates a pulse at the instant the buckle is coupled with the connector, indicating that the seat belt is being worn.

The control pulse generating circuit 130b comprises elements similar to those of the circuit 130a but generates a control pulse when the input changes from the 0 state to the 1 state, indicating uncoupling of the buckle and the connector.

The slack sensor 10 is connected to the above-mentioned NOR gate 191 by a resistor 114 and a filter circuit 120 similar to the filter circuit 110. The NOR gate 191 provides for an output 1 only when both signals passing through the filter circuits 110 and 120 are in the 0 state. Therefore, an input changed from the 0 state to the 1 state of a control pulse generating circuit 130c is obtained when the slack sensor 10 is turned on while the buckle is coupled. The circuit 130c comprises elements similar to those of the circuit 130b and generates a control pulse when it receives an input, as described above.

These control pulse generating circuits 130a to 130c are connected to a first driving circuit 180 of the motor 6 by diodes 192a to 192c, to a power supply circuit 160 by an inverter 193 and a NOR gate 194, and to a second driving circuit 150 of the motor 6 by a circuit 170. The first driving circuit 180 comprises, as shown, resistors 181, 182, 184, and 185 and transistors 183 and 186. The first driving circuit 180 supplies two different levels of voltage to the motor 6, which receives the power voltage from the battery charger through the power supply circuit 160. Power supply circuit 160 comprises resistors 161, 162, and 166, transistors 163 and 167, and zener diodes 164 and 165 and produces a high voltage of about 12 volts when the output from the NOR gate 194 is in the 0 state and a medium voltage of about 6 volts when the output from the NOR gate 194 is in the 1 state.

The second driving circuit 150 comprises resistors 151a, 151b, 153a, 153b, 155, and 156, transistors 152, 154, and 159, a condenser 157, and a zener diode 158 and supplies a low voltage, for example, just enough to prevent the winding shaft 2 from idling. The circuit 170 decides whether or not the second driving circuit 150 is in a state in which it can supply a low power to the motor 6 depending on the condition of the belt. The circuit 170 comprises a D-type flip-flop circuit 171 and OR gates 172 and 173. The OR gate 172 is connected to the circuit 130b, a reset circuit 140, and a counterelectromotive force-detecting circuit 200. The reset circuit comprises a condenser 141, a resistor 142, a diode 143, and a NAND gate 144. The circuit 200 comprises a variable resistor 201, resistors 202 to 205, a comparator 206, zener diodes 207 and 208, and a condenser 209 for cutting off the low voltage of the second driving circuit 150 when the motor generates a counterelectromotive force, for example, when the seat belt is elongated due to the movement of the driver or passengers.

The operation of the seat belt 3 and the motor 6 described above is illustrated in FIG. 10. The horizontal axis shows the process of putting on the seat belt. The seat belt is first drawn out of the retractor, and is put on and then the buckle is coupled with the connector, as shown at point A. When the driver gets out of the automobile, the buckle is uncoupled from the connector at point D. These are the only manual operations required. The driver and passengers can comfortably wear the belt without having a feeling of constriction, and can move freely since the belt tension is considerably low. If a slack in the belt occurs, the slack is eliminated automatically, as is described below.

During buckling of the belt 3, as a voltage is not supplied to the motor 6, the belt 3 is easily drawn around the driver's or passenger's body while the motor is idling. The belt tension a is shown in (1) of the graph.

In the prior art retractor, which utilizes a spiral spring which creates a spring force, a greater manual force is required to draw out the belt, as shown by the broken line b in (1) of the graph.

When the buckle is coupled with the connector, the belt is somewhat overextended and therefore is slack, as shown by the curve c in (2) of the graph. But at this instant, the buckle sensor 9 is switched on, as shown in (5) of the graph. This changing signal, as previously described, causes the first control pulse generating circuit 130a to generate a signal in the 1 state for a predetermined period of time. This generated signal in turn causes the first driving circuit 180 and its power supply circuit 160 to supply a high voltage to the motor 6. This voltage is shown by d in (3) of the graph. Thus, the motor 6 rotates to wind the slackened seat belt 3 onto the winding shaft 2, the belt being tightened as shown by the curve e in (2) of the graph.

The slack sensor 10 is switched off when the slip joint 20 is brought near to the second position, as previously described, and outputs a signal to drive the motor 6 only when it is changed from on to off while the seat belt is being worn. Such a condition occurs, for example, when the driver or a passenger reaches for a distant object, this period being shown between points B and C and B' and C'. When the movement of the driver or a passenger is great, the belt becomes constricting, as shown by the curves f and f' in (2) of the graph, and the belt is drawn out of the retractor. This causes a counterelectromotive force to be generated in the motor, this force being detected by the circuit 200. Thereby, the low voltage g in (3) of the graph, which voltage is usually supplied to the motor 6 by the second driving circuit 150 to prevent the winding shaft 2 from rotating freely, is interrupted so that it becomes 0 voltage (h in (3) of the graph). Therefore, no force is applied to the winding shaft 2 or the seat belt 3 except the force necessary for the motor to rotate freely. Thus, the driver and passengers can move freely.

When the driver or passenger returns to his original position at point C or C', a slack occurs in the belt, as shown by i in (2) of the graph. This slack is detected by the slack sensor 10, wherein the switch is turned from on to off, as shown by j in (4) of the graph. This changing signal causes the third control pulse generating circuit 130c to generate a pulse for a predetermined period of time, this generated pulse in turn causing the first driving circuit 180 and its power supply circuit 160 to supply a medium voltage k (in (3) of the graph) to the motor. Thus, the slack is eliminated.

When the buckle is uncoupled at point D, the buckle sensor 9 is turned off. This causes the second control pulse generating circuit 130b to generate a pulse which generates a high voltage l, in (3) of the graph, whereby the seat belt is wound or retracted.

It is advantageous that the seat belt be wound at first at the high voltage d immediately after it is put on and then at a medium voltage when a slack occurs while the belt is being worn because a high voltage is favorable for winding both the shoulder belt and the lap belt and a medium voltage is favorable for winding mainly the shoulder belt since a slack occurs mainly in the shoulder belt due to movement of the upper part of the body.

Figure 11B:
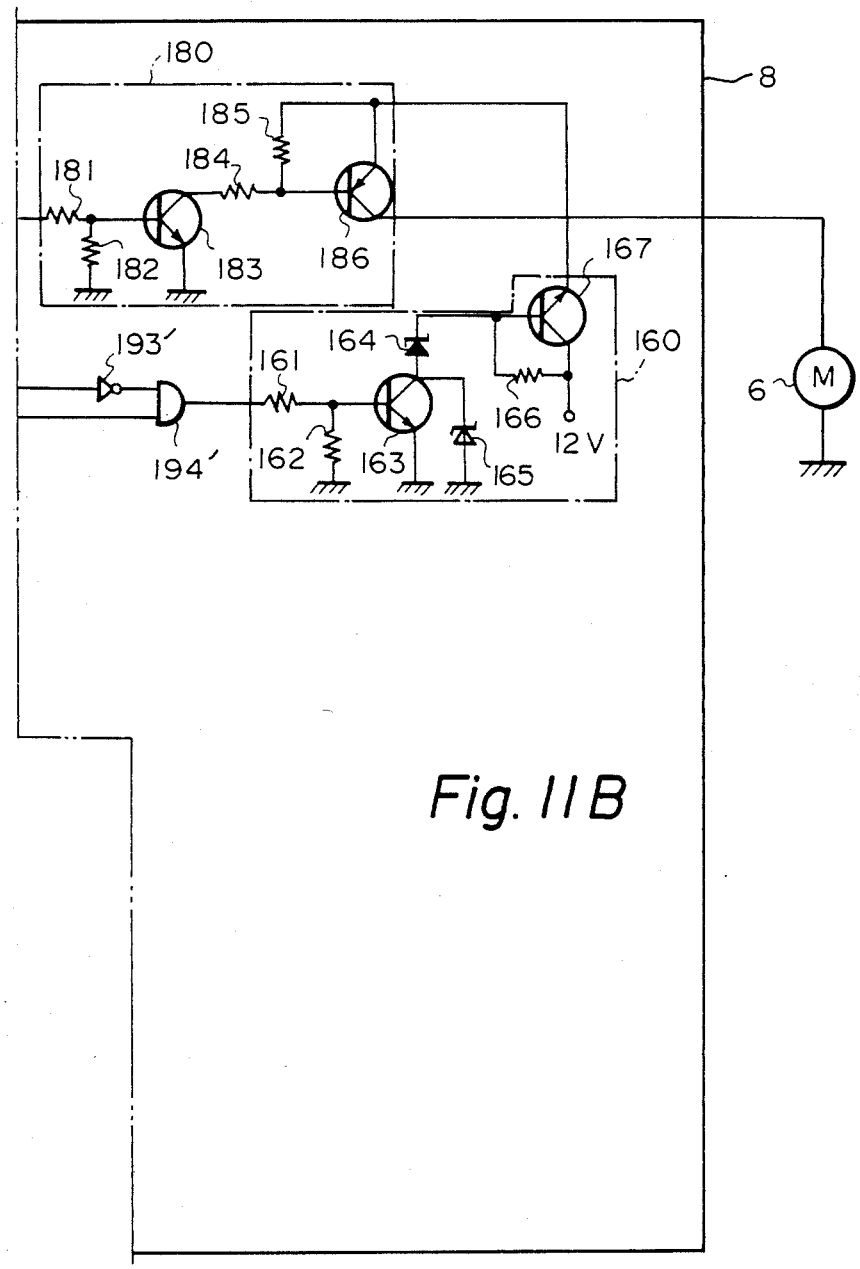

FIG. 11 shows another example of a controller 8 for controlling the motor 6. This controller is similar to the controller in FIG. 9 but differs from it in that the second driving circuit 150 in FIG. 9 for supplying a low voltage and its cooperating circuits are omitted in FIG. 11, the inverter 193 and the NOR gate 194 are changed to an inverter 193' and an AND gate 194', respectively, and an emergency belt tension circuit is added. The emergency belt tension circuit comprises an overspeed detecting circuit 210 and a brake detecting circuit 220. The overspeed detecting circuit 210 comprises an input means of a conventional speed meter 221, diodes 211a to 211c, resistors 212a, 212b, 216a, 216b, and 217a to 217d, condensers 213, 214, and 218, a variable resistor 215, and a comparator 219. The input from the speed meter 221 is charged into the condenser 214, the voltage of which is input into the comparator 219. A voltage decided by the resistors 216a and 216b in accordance with a predetermined speed value (for example, 40 km/h) is also input into the comparator 219. The comparator 219 outputs a signal in the 1 state to an AND gate 230 when the running speed exceeds the predetermined speed. Another input is delivered to the AND gate 230 from the brake detecting circuit 220, which comprises a conventional brake switch 220a and a brake lamp 220b, through resistors 222a and 222b and zener diode 223. When the brake pedal is pressed down, the signal in the 1 state is input into the AND gate 230. The AND gate 230 produces a signal to drive the motor 6 at a high voltage when both inputs from the circuits 210 and 220 are in the 1 state, in expectation of an emergency. The seat belt is then fastened more tightly so as to more firmly hold the driver and passengers in the seat.

Figure 12:
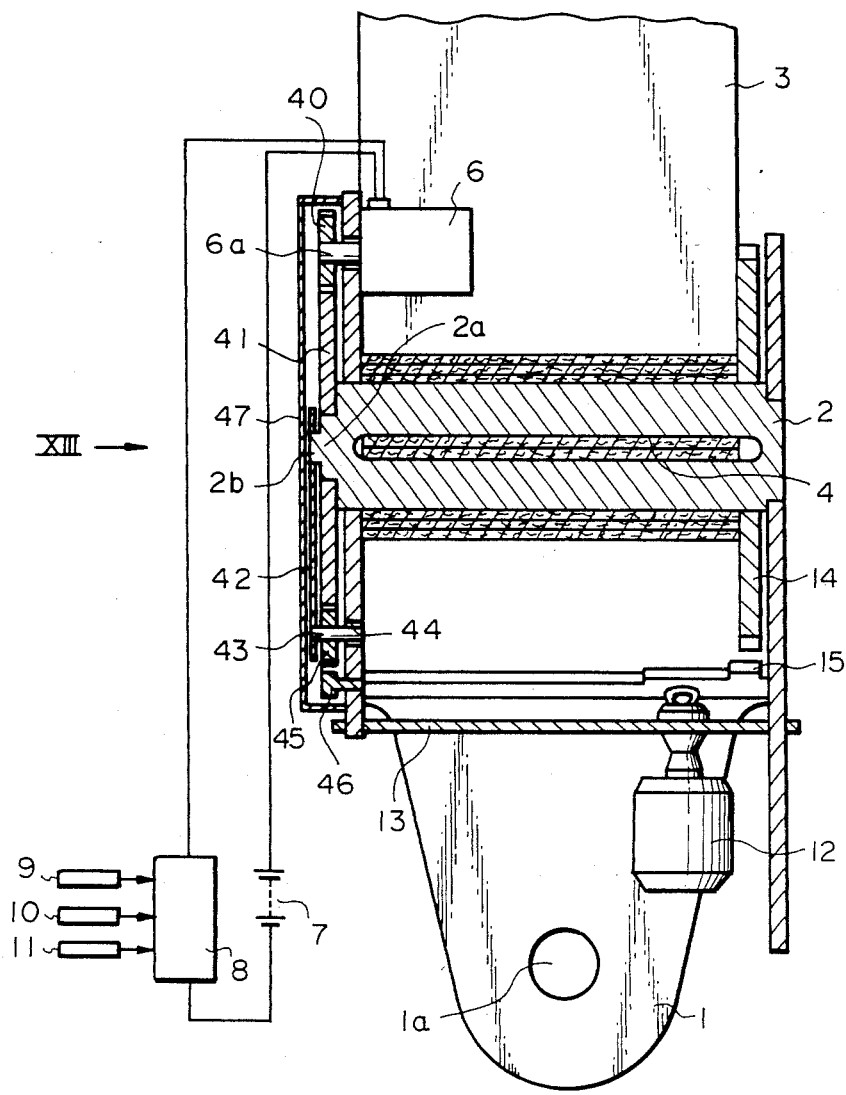
FIG. 12 is a schematic sectional front view of a seat belt winding device, according to another embodiment of the invention.
Figure 13:
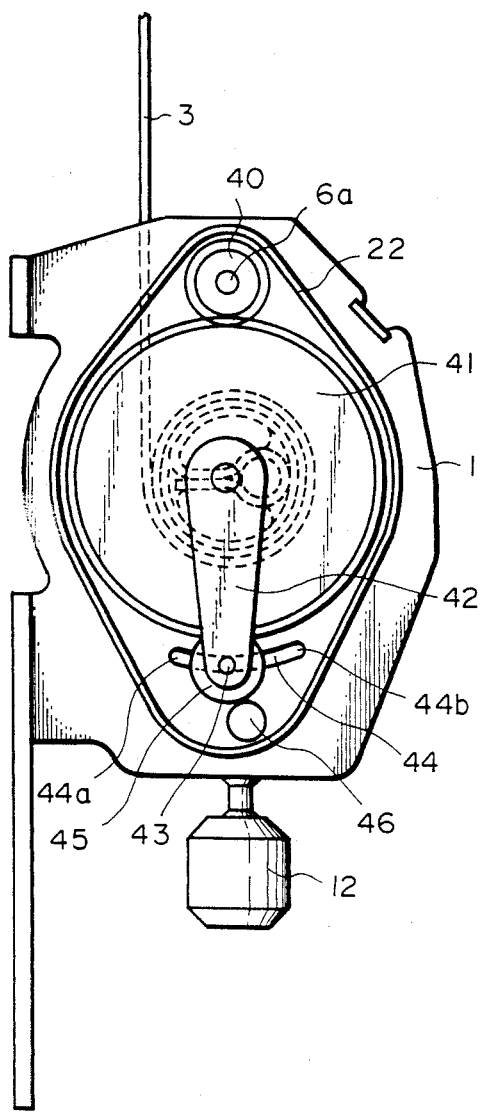
FIG. 13 is a side view of the device taken in the direction of the arrow XIII in FIG. 12.

FIGS. 12 and 13 show another embodiment of the seat belt winding apparatus according to the present invention. The apparatus in this embodiment comprises a retractor having the same locking mechanism as that in FIG. 1 and a winding mechanism similar to that in FIG. 1. The winding mechanism comprises a winding shaft 2, a controller 8, and sensors 9, 10, and 11 similar to those of FIG. 1. But the winding shaft 2 is connected to the motor 6 by a reduction means comprising mutually mating gears 40 and 41. The gear 40 is tightly fixed to the rotating shaft 6a of the motor 6, and the gear 41 is tightly fixed to an end portion of the shaft 2.

On the edge 26 of the shaft 2, one end of an arm 42 is rotatably attached. The arm 42 has a shaft 43 on its other end. The shaft 43 can move freely in a groove 44 concentrically formed in the retractor wall relative to the gear 41. A third gear 45 is rotatably attached to the shaft 43. The third gear 45 mates with the gear 41, which is tightly fixed to the shaft 2. Thus, the third gear 45 can move together with the shaft 43 within the limits determined by the groove length. On the path of the third gear 45, a brake element 46 of deformable elastomeric material is firmly fixed to the retractor wall at a location described below. These elements are covered by a cover 47, which is omitted in FIG. 13 for the sake of clarity.

The seat belt 3 can be wound or drawn out in the manner described above. But the third gear 45 is rotatingly moved in a clockwise direction in FIG. 13 by the large gear 41 due to a force manually applied to the seat belt 3 when the seat belt 3 is drawn out so as to be worn, with the result that the third gear 45 can run over the elastomeric element 46, thereby deforming it. When the shaft 43 reaches one end 44a of the groove 44, the third gear 45 rotates freely at that point. Subsequently, the seat belt 3 is wound to remove the slack thereof by applying a voltage to the motor, as described previously. This causes the third gear 45 to move in a counterclockwise direction, thereby running over the element 46. Then the shaft 43 reaches the other end 44b of the groove 44, where the third gear can freely rotate.

The location of the brake element 46 is selected so that the path of the third gear 45 is short between the point at which the shaft 43 is in the groove end 44b and the point at which the third gear 45 contacts the brake element 46 from the groove end 44b. Therefore, the third gear 45 can freely rotate at the end 44b while the motor 6 is being driven, but the third gear 45 contacts the brake element 46 after driving of the motor is stopped. This prevents the seat belt from slacking due to minor movement of the driver or passengers. When there is considerable movement on the part of the driver or passengers, the third gear 45 runs over the element 46 and deforms it, thereby preventing excessive constriction. After considerable movement on the part of the driver or passengers, the slack in the seat belt is eliminated by the driving of the motor in response to the slack sensor 10, the driving of the motor causing the third gear 45 to move to the right end 44b of the groove 44. When, the third gear 45 is in this position, further slackening of the seat belt due to minor movement on the part of the driver or passengers is prevented and there is less of a feeling of constriction.

Figure 14:
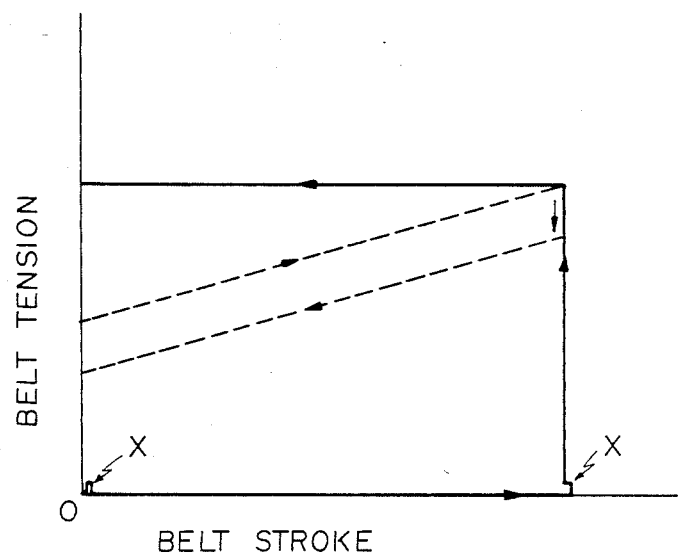
FIG. 14 is a graph showing the belt tension.

The belt tension is shown relative to the belt stroke in FIG. 14. The solid line shows a characteristic line of the above embodiment and the broken lines show characteristic lines of a prior art apparatus. The belt is buckled, worn, and retracted in a sequence, as shown by the arrows. The point where the gear 45 runs over the element 46, thereby deforming it, is indicated by x. The bottom solid line shows the tension while the seat belt is being worn. The top solid line shows the tension when the seat belt is retracted by the motor. These lines are also applicable to the previously described embodiment. The tension which occurs when the gear 45 runs over the element 46 is not so great.

We claim:
1. An automobile seat winding device, comprising:
   a seat belt retractor, said retractor having a rotatable winding shaft for the seat belt to be wound thereonto;
   a means for driving said shaft for winding said seat belt;
   a first sensor for sensing whether said seat belt is being worn or not;
   a second sensor for sensing a slack in said seat belt;
   a slip joint, rotatably provided around a predetermined axis, for guiding said seat belt and being pivotally provided so that it can move between a first position, in which it hangs freely from a pivot shaft means, and a second position, in which it is tapered relative to said first position due to the belt tension, and said second sensor is a switch which is operated due to the change of the angular position around said predetermined axis of said slip joint; and
   a control means responsive to said first and second sensors for controlling said driving means so that said driving means winds said seat belt after said seat belt is taken off and where there is a slack in said seat belt while said seat belt is being worn.

2. A device according to claim 1, wherein said driving means comprises an electric direct-current motor operably connected to said winding shaft.

3. A device according to claim 1, wherein a spring is provided to bias said slip joint toward said first position.

4. A device according to claim 3, wherein said spring is disposed so that it pushes a motive portion of said switch in accordance with the position of said slip joint.

5. A device according to claim 3, wherein one contact terminal of said switch is formed by said spring itself and the other contact terminal of said switch is formed by a stationary conductive element disposed so that said element can make contact with said spring in accordance with the position of said slip joint.

6. A device according to claim 5, wherein an insulation collar is firmly attached to said pivot shaft means, said insulation collar having a recess on its outer surface, into which recess said conductive element is firmly inserted, and said spring is a coil spring disposed over said insulation collar, one end of said coil spring being firmly attached to said insulation collar, the other end of said coil spring being firmly attached to said slip joint, and said coil spring having an inward projection near said other end to form a contact terminal.

7. A device according to claim 1, wherein a brake means is further provided for preventing a slack in said seat belt while it is being worn.

8. A device according to claim 7, wherein said brake means comprises a gear connected to and rotating with the winding shaft and an elastomeric element located on the path of said gear, thus preventing the winding shaft from freely rotating due to the slack in said seat belt.

9. A device according to claim 2, wherein said control means comprises a plurality of control pulse generating circuits responsive to said sensors and a driving circuit responsive to control pulse outputs transmitted from said control pulse generating circuit for outputting the voltage for the motor.

10. A device according to claim 9, wherein said driving circuit outputs two voltage values in response to said sensors.

11. A device according to claim 10, wherein a further driving circuit is provided for outputting a voltage lower than said two voltage values.

12. A device according to claim 10, wherein an emergency pre-detecting circuit is further provided for outputting a control signal which causes said seat belt to be tightened.

13. An automobile seat winding device, comprising:
a seat belt retractor, said retractor having a rotatable widding shaft for the seat belt to be wound thereonto;
a means for driving said shaft for winding said seat belt;
a first sensor for sensing whether said seat belt is being worn or not;
a slip joint for guiding said seat belt and being pivotally provided so that it can move between a first position, in which it hangs freely from a pivot shaft means, and a second position, in which it is tapered relative to said first position due to the belt tension;
a second sensor for sensing a slack in said belt, said second sensor being in the form of a switch including a spring, for biasing said slip joint toward said first position and for forming one contact terminal of said switch, and a stationary conductive element, for forming the other contact terminal of said switch, said stationary conductive element being disposed to make contact with said spring in accordance with the position of said slip joint;
an insulation collar being firmly attached to said pivot shaft means, said insulation collar having a recess on its outer surface, into which recess said stationary conductive element is firmly inserted, and said spring being a coil spring disposed over said insulation collar, one end of said coil spring being firmly attached to said insulation collar, the other end of said coil spring being firmly attached to said slip joint, and said coil spring having an inward projection near said other end to form a contact terminal; and
a control means responsive to said first and second sensors for controlling said driving means so that said driving means winds said seat belt after said seat belt is taken off and when there is a slack in said seat belt while said seat belt is being worn.

14. An automobile seat winding device, comprising:
a seat belt retractor, said retractor having a rotatable winding shaft for the seat belt to be wound thereonto;
a means for driving said shaft for winding said seat belt;
a first sensor for sensing whether said seat belt is being worn or not;
a second sensor for sensing a slack in said seat belt;
a slip joint for guiding said seat belt and being pivotally provided so that it can move between a first position, in which it hangs freely from a pivot shaft means, and a second position, in which it is tapered relative to said first position due to the belt tension, and said second sensor is a switch which is operated due to the changing of the position of said slip joint;
a control means responsive to said first and second sensors for controlling said driving means so that said driving means winds said seat belt after said seat belt is taken off and when there is a slack in said seat belt while said seat belt is being worn; and
a brake means for preventing a slack in said seat belt while it is being worn.

15. A device according to claim 14, wherein said brake means comprises a gear connected to and rotating with the winding shaft and an elastomeric element located on the path of said gear, thus preventing the winding shaft from freely rotating due to the slack in said seat belt.

* * * * *